_United States Patent Office_

3,493,575
Patented Feb. 3, 1970

3,493,575
1,4-CHLOROSUBSTITUTED-2,3,5,6-PIPERAZINETETRAONES
Donald A. Tomalia, Midland, Mich., assignor to The Dow Chemical Company, Midland, Mich., a corporation of Delaware
No Drawing. Filed May 16, 1967, Ser. No. 638,773
Int. Cl. C07d *51/72*; A01n *9/22*
U.S. Cl. 260—268                5 Claims

ABSTRACT OF THE DISCLOSURE

Compounds of the formula:

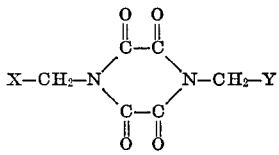

wherein X is chloromethyl or chloroethyl and Y is X or α-chlorobenzyl, for example, 1,4 - bis(2 - chloroethyl)-2,3,5,6-piperazinetetraone, 1-(2-chloroethyl)-4-(β-chlorophenethyl)-2,3,5,6-piperazinetetraone and 1 - (2 - chloroethyl)-4-(2-chloropropyl)-2,3,5,6 - piperazinetetraone, are novel compounds which possess insecticidal activity.

The novel method for preparing 1,4-(substituted) piperazinetetraones comprises reacting a 2,2'-bi-2-heterocyclic compounds corresponding to one of the formulas

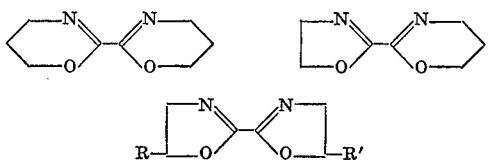

and an oxalyl bromide or oxalyl chloride in an inert anhydrous organic hydrocarbon or halohydrocarbon solvent as reaction medium at a temperature of from 20° to 200° C.; R represents hydrogen or methyl and R' represents hydrogen, methyl or phenyl.

---

The present invention is directed to new 1,4-substituted-2,3,5,6-piperazinetetraones and to a new method for producing 1,4-substituted-2,3,5,6 - piperazinetetraones. The new compounds of the present invention have the formula:

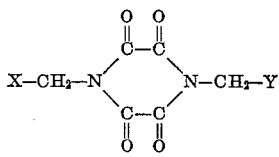

wherein X is chloromethyl or chloroethyl and Y is X or α-chlorobenzyl, 1,4-bis(2-chloroethyl)-2,3,5,6-piperazinetetraone, 1-(2-chloroethyl) - 4 - (β - chlorophenethyl)-2,3,5,6-piperazine tetraone and 1-(2-chloroethyl)-4-(2-chloropropyl)-2,3,5,6-piperazinetetraone constitute preferred embodiments of the invention. The new compounds are crystalline solid materials which are soluble in many common organic solvents and of low solubility in water. The compounds of the present invention are useful for the kill and control of insects and arachnids such as southern armyworms and two spotted spider mites.

The new compounds are prepared by a novel method which is also employed to prepare other useful 1,4-substituted-2,3,5,6-piperazinetetraones. The method of the present invention comprises reacting a 2,2' - bi-2-heterocyclic compound corresponding to one of the formulas

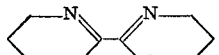 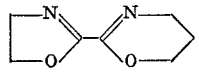

or

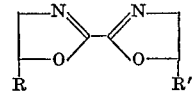

and oxalyl bromide or oxalyl chloride in an anhydrous inert hydrocarbon or halohydrocarbon solvent at a temperature of from about 20° to 200° C. In the above formula and hereafter in the present specification and claims, R represents hydrogen or methyl and R' represents hydrogen, methyl or phenyl.

The reaction is carried out in a hydrocarbon or halohydrocarbon solvent which will not react with the starting materials or with the piperazinetetraone product. It is preferred to employ a hydrocarbon or halohydrocarbon solvent which boils at about 100° C. or above. Furthermore, it is critical and essential to the present method that the inert hydrocarbon or halohydrocarbon solvents to be employed as reaction media be anhydrous. The presence of water in the reaction mixture will result in side reactions will decrease the yield and if enough water is present, will prevent the formation of the 1,4-substituted-2,3,5,6-piperazinetetraone product. Representative hydrocarbon or halohydrocarbon solvents to be employed as reaction media include toluene, benzene, carbon tetrachloride, methylchloroform, chloroform, chlorobenzene, methylene chloride, dichlorobenzenes and xylenes. Preferred solvents include toluene, o-, m- and p-xylenes, and o-, m- and p-dichlorobenzenes.

The reaction is exothermic and proceeds readily at temperatures of from about 20° to 200° C. and preferable at temperatures of from 100° C. to 125° C. The temperature of the reaction mixture is maintained within the reaction temperature range for from about one half hour to several days. When a reaction temperature within the preferred temperature range or higher is employed, the reaction proceeds to completion within from 1 to 4 hours. When the reaction temperature is below the preferred temperature range the reaction may take up to several days for completion. While the method of the present invention is generally carried out under atmospheric pressure, when it is desired to carry out the method at a temperature which exceeds the boiling temperature of the reaction mixture, it is necessary to place the reaction mixture under superatmospheric pressure.

In carrying out the reaction it is desirable to employ apparatus designed to exclude contamination of the reaction mixture by moisture and constructed to resist corrosion. In general conventional apparatus constructed of or lined with glass can be adapted for this purpose.

The reaction consumes the oxalyl chloride or oxalyl bromide and 2,2'-bi-2-heterocyclic starting materials in equimolar proportions and the use of substantially equimolar proportions of the starting materials is preferred. However, the use of large excesses of either of the starting materials will not materially affect the method of the present invention. The use of such excesses, however, is generally unduly expensive and therefore undesirable.

In carrying out the method of the present invention, the reactants are mixed together in the inert hydrocarbon or halohydrocarbon solvent in any order or fashion. The temperature of the reaction mixture is maintained within the reaction temperature range for from about one half hour to several days with the longer time periods being employed at the lower temperatures. Upon completion of the reaction, the low boiling constituents of the reaction mixture are removed by evaporation or distillation and an oily or solid residue obtained. This oily or solid product residue is then further purified by conventional procedures such as washing or recrystallization.

The following examples are illustrative of the invention and are not to be construed as limiting.

EXAMPLE 1

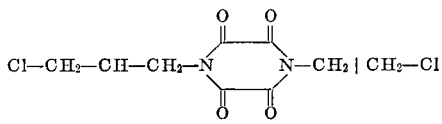

5,6-dihydro-2(2-oxazolin-2-yl)-4H - 1,3 - oxazine (1.6 grams; 0.0104 mole) was added with stirring to 20 milliliters of dry toluene. To the stirred solution was added slowly dropwise with stirring, oxalyl chloride (1.40 grams; 0.0104 mole) in 5 milliliters of toluene. Following the addition of the oxalyl chloride, the reaction mixture was heated at the boiling temperature and under reflux for 25 to 30 minutes. During the heating period the product precipitated in the reaction mixture as a crystalline solid. This crystalline solid product was separated by filtration and washed with two 15 milliliter portions of diethyl ether. The washed 1-(2-chloroethyl)-4-(3-chloropropyl)-2,3,5,6-piperazinetetraone product was found to melt at 248°–250° C.

EXAMPLE 2

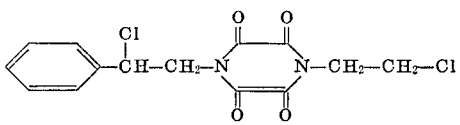

5-phenyl-2,2'-bi-2-oxazoline was dispersed with stirring in 20 milliliters of toluene. To this solution was added slowly dropwise a solution of oxalyl chloride (1.35 grams; 0.1 mole) dissolved in 10 milliliters of toluene. During the addition of the oxalyl chloride solution, a white precipitate formed in the reaction mixture. Upon completion of the addition of the oxalyl chloride the reaction mixture was heated to the boiling temperature and under reflux for 1 hour. Following the heating period, the reaction mixture was cooled to room temperature and filtered to remove the crystalline solid product which had precipitated in the reaction mixture during the heating period. This crystalline material was separated by filtration and recrystallized from an acetone-methanol mixture to obtain the crystalline 1-(2-chloroethyl)-4-(β-chlorophenethyl)-2,3,5,6-piperazinetetraone product melting at 215°–216° C.

EXAMPLE 3

5,5'-dimethyl-2-2'-bi-2-oxazoline (15.4 grams; 0.1 mole) is dispersed in 200 milliliters of orthochlorobenzene. To this solution is added slowly dropwise, with stirring, a solution of oxalyl bromide (21.6 grams; 0.1 mole) in 50 milliliters of orthodichlorobenzene. The resulting reaction mixture is heated at the boiling temperature and under reflux for a period of about 15 minutes and the reaction thereafter allowed to cool to room temperature. During the cooling procedure the 1,4-bis(2-bromopropyl)-2,3,5,6-piperazinetetraone product, having a molecular weight of 384, precipitates as a crystalline solid material and is isolated by filtration. The identity of the product is confirmed by infrared and nuclear magnetic resonance spectra.

EXAMPLE 4

5,5',6,6'-tetrahydro-2,2'-bi-4H-1,3-oxazine (2.3 grams; 0.0137 mole) was dispersed in 25 milliliters of dry toluene with stirring. To this dispersion, was added slowly portionwise over a period of about 5 minutes, a solution of oxalyl chloride (1.74 grams; 0.0137 mole) in 5 milliliters of toluene. Upon the addition of the oxalyl chloride, a white mass precipitated in the reaction mixture with a moderate exotherm raising the temperature of the reaction mixture to about 43° C. The reaction mixture was then heated to the boiling temperature and under reflux for a period of 30 minutes. Following the heating period, the reaction mixture was cooled in an ice bath and filtered to remove the solid product that had precipitated therein. This solid product was slurried in diethyl ether, refiltered, and recrystallized from a methanol acetone mixture. The recrystallized 1,4 - bis(3-chloropropyl)-2,3,5,6-piperazinetetraone product was found to melt at 282°–283° C.

EXAMPLE 5

2,2'-bi-2-oxazoline (2.0 grams; 0.0143 mole) was dispersed in 50 milliliters of dry toluene and a solution of oxalyl chloride (1.8 grams; 0.014 mole) in 5 milliliters of dry toluene was added thereto dropwise with stirring. Following the addition of the oxalyl chloride, the reaction mixture was heated at the boiling temperature and under reflux for 45 minutes. During the heating period a solid material precipitated in the reaction mixture. After the heating period, the reaction mixture was cooled in an ice bath, and the precipitated solid product removed by filtration. The solid product was then washed with n-hexane, air-dried and the air-dried product recrystallized from acetone. The recrystallized 1,4-bis(2-chloroethyl)-2,3,5,6-piperazinetetraone product was found to melt at 221°–222° C.

The compounds of the present invention or compositions containing the same as the toxic constituent are useful for the control and kill of insects and arachnids such as southern armyworm and two-spotted spider mites. In such uses, the unmodified product can be employed. The product can also be dispersed on a finely divided solid and employed as a dust. Also, such mixtures may be dispersed in water with or without the aid of a surface-active dispersing agent and the resulting aqueous suspension employed as sprays. In other procedures, the products are employed as the toxic constituents in solvent solutions, oil-in-water or water-in-oil emulsions or aqueous dispersions. In representative operations 1-(2-chloroethyl)-4-(β-chlorophenethyl)-2,3,5,6-piperazinetetraone and bis (2-chloroethyl)piperazinetetraone each when employed as as sole toxic constituent in an aqueous dispersion composition at a concentration of 1500 parts per million give good kills of southern armyworm. The aqueous composition is applied to the leafs of bean plants, and the southern armyworm allowed to feed on the treated leaves.

The 2,2'-bi-2-oxazoline starting material employed in the present invention is prepared in accordance with the method of Wenker, J. Am. Chem. Soc., 60, 2152 (1938).

The 5-phenyl-2,2'-bi-2-oxazoline and 5-methyl-2,2'-bi-2-oxazoline starting materials were prepared in the following manner: Chloroplyoxylic acid ethyl ester was reacted with aziridine in methylene chloride as reaction medium. The reaction mixture was heated at the boiling temperature and under reflux for from one to two hours to prepare the N-(2-chloroethyl)oxamic acid ethyl ester which can be further reacted in situ or isolated before being further reacted. The N-(2-chloroethyl)-oxamic acid ethyl ester is then reacted with either α-(aminomethyl)benzyl alcohol or with 1-amino-2-propanol depending upon whether the respective 5-phenyl or 5-methyl substituted 2,2'-bi-2-oxazoline starting material is desired. The N-(2-chloroethyl)oxamic acid ethyl ester and appropriate alcohol are heated together at the boiling temperature and under reflux for about 2 hours and thereafter the reaction mixture is concentrated to dryness to obtain a N-(2-chloroethyl)-N'-(β-hydroxyphenethyl)oxamide or N-(2-chloroethyl)-N'-(2-hydroxypropyl)oxamide intermediate. The intermediate thus obtained was then reacted with a two-fold excess of thionyl chloride at the boiling temperature of the reaction mixture for about two hours. Following the reaction period, the excess thionyl chloride was removed by distillation to obtain the N-(2-chloroethyl)-N'-(β-chlorophenethyl)oxamide or N-(2-chloroethyl)-N'-(2-chloropropyl)oxamide final intermediate. The appropriate final intermediate is then reacted with 2 equivalents of potassium hydroxide in methanol or ethanol to effect dehydrohalogenation and ring closure to form the corresponding 5-phenyl-2,2'-bi-2-oxazoline or 5-methyl-2,2'-bi-2-oxazoline starting material. In a representative preparation, the dehydrohalogenation was accomplished by reacting N,N'-bis(2-chloropropyl)-oxamide with two molar proportions of potassium hydroxide in methanol. The reaction mixture was heated at the boiling temperature and under reflux for 1 hour. Following the reaction period the reaction mixture was filtered to remove the potassium chloride and the ethanol or methanol removed by evaporation to obtain the 5,5'-dimethyl-2,2'-bi-2-oxazoline starting material.

The 5,6 - dihydro - 2 - (2-oxazolin-2-yl)-4H-1,3-oxazine starting material was prepared in a similar procedure. Chloroglyoxylic acid ethyl ester was reacted with aziridine to produce N-(2-chloroethyl)oxamic acid ethyl ester. The N-(2-chloroethyl)oxamic acid ethyl ester was then reacted with 3-hydroxypropylamine to produce N-(3-hydroxypropyl)-N'-(2-chloroethyl)oxamide which is then reacted with thionyl chloride to produce N-(3-chloropropyl)-N'-(2-chloroethyl)-oxamide. The N-(3-chloropropyl)-N'-(2-chloroethyl)-oxamide is then dehydrohalogenated and cyclized with potassium methoxide to prepare the 5,6-dihydro-2-(2-oxazolin-2-yl)-4H-1,3-oxazine starting material.

The 5,5',6,6'-tetrahydro-2,2'-bi-4H-1,3-oxazine starting material is prepared in a similar procedure. In such a procedure, diethyl oxalate is reacted with 3-hydroxypropyl amine in methylene chloride as reaction medium to prepare the N,N'-bis(3-hydroxypropyl)-oxamide. The latter is reacted with thionyl chloride to produce N,N'-bis(3-chloropropyl)-oxamide which is then dehydrohalogenated and cyclized with potassium methoxide, as previously described, to obtain the 5,5'-6,6'-tetrahydro-2,2'-bi-4H-1,3 oxazine starting material.

The 5,5'-dimethyl-2,2'-bi-2-oxazoline starting material was obtained by the dehydrohalogenation-cyclization of N,N'-bis(2-chloropropyl)-oramide. The dehydrohalogenation is accomplished by reacting N,N'-bis(2-chloropropyl)-oxamide with two equivalents of potassium hydroxide in methanol. The reaction mixture is heated at the boiling temperature and under reflux for about 1 hour. Following the reaction period the reaction mixture is filtered to remove the potassium chloride and the ethanol or methanol is removed by evaporation to obtain the 5,5'-dimethyl-2,2'-bi-2-oxazoline starting material as a residue.

As is made apparent from the foregoing examples and discussion, the term "chloroethyl," as applied in defining the X and Y substituents in the formula of the novel compounds, is inclusive of α-chloroethyl and β-chloroethyl.

I claim:
1. The substituted piperazinetetraones having the formula

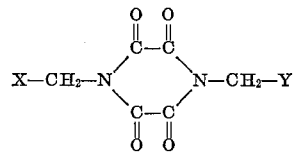

wherein X represents chloromethyl or chloroethyl and Y represents chloromethyl, chloroethyl or α-chlorobenzyl.

2. The compound of claim 1 which is 1,4-bis(2-chloroethyl)-2,3,5,6-piperazinetetraone.

3. The compound of claim 1 which is 1-(2-chloroethyl)-4-(β-chlorophenethyl)-2,3,5,6-piperazinetetraone.

4. The compound of claim 1 which is 1-(2-chloroethyl)-4-(2-chloropropyl)-2,3,5,6-piperazinetetraone.

5. The method which comprises reacting a 2,2'-bi-2-heterocyclic compound corresponding to one of the formulas

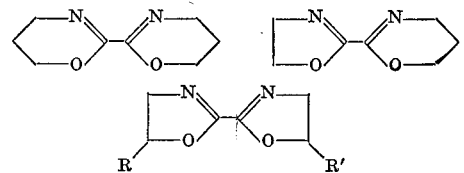

wherein R represents hydrogen or methyl and R' represents hydrogen, methyl or phenyl, with oxalyl bromide or oxalyl chloride in an inert anhydrous hydrocarbon or halohydrocarbon solvent at a temperature of from about 20° to about 200° C.

References Cited

McDonald: Jour. Org. Chem., vol. 24, p. 1580–1 (1959).

DOUGLAS G. DAUS, Primary Examiner

U.S. Cl. X.R.
260—239, 244